United States Patent [19]

She et al.

[11] Patent Number: 5,225,670

[45] Date of Patent: Jul. 6, 1993

[54] X-RAY TO VISIBLE IMAGE CONVERTER WITH A CATHODE EMISSION LAYER HAVING NON-UNIFORM DENSITY PROFILE STRUCTURE

[75] Inventors: Yangzheng She, Ellicott City; Weilou Cao, Adelphi, both of Md.; Xiaowen Yang; Shizheng Zhen, both of Shanghai, China; Xinan Lu; Hanping Wang, both of Shanghai, China; Ming-guang Li, Hyattsville; Yanhua Shih, Ellicott City, both of Md.

[73] Assignee: CSL Opto-Electronics Corp., Ellicott City, Md.

[21] Appl. No.: 665,474

[22] Filed: Mar. 6, 1991

[51] Int. Cl.$^5$ ............................................. H01J 31/50
[52] U.S. Cl. ............................. 250/214 VT; 313/530
[58] Field of Search ................... 250/214 VT, 213 R; 313/528, 530, 542, 544, 526

[56] References Cited

U.S. PATENT DOCUMENTS

| | | | |
|---|---|---|---|
| 3,716,714 | 2/1973 | Niewold et al. | 250/213 VT |
| 3,961,182 | 6/1976 | Spicer | 250/213 VT |
| 4,447,721 | 5/1984 | Wang | 250/213 VT |
| 4,481,531 | 11/1984 | Warde et al. | 313/528 |
| 4,725,724 | 2/1988 | van der Velden | 313/542 |
| 4,882,481 | 11/1989 | Gilligan et al. | 250/213 VT |

Primary Examiner—David C. Nelms
Assistant Examiner—Que T. Le
Attorney, Agent, or Firm—Whitham & Marhoefer

[57] ABSTRACT

High quantum efficiency ($\geq 5\%$) ultrafast ($\leq 100$ picosecond) and broad band (30 KeV to 80 KeV for medical application) X-ray photo-electron cathode, high gain X-ray real time image intensifier and portable low intensity real time projection type X-ray imagescope use new vacuum photo-electron devices. A new type X-ray photo-electron cathode has a specially designed alkali halide electron emission layer that makes possible high quantum efficiency, high speed and broad band X-ray photon detection. An X-ray photo-electron cathode followed by a direct coupled micro channel plate and an output phosphor display screen form a new type panel shaped direct view X-ray intensifier tube which can have both high spatial resolution ($\geq 10$ lp/mm) and high gain ($\geq 10^4$). The thickness of this panel shaped disc X-ray intensifier can be less than 1 cm. A portable real time projection X-ray imagescope which employs this new type X-ray intensifier and other devices (small x-ray tube, small built-in high voltage power supply) can be widely used for medical, industrial and security applications.

12 Claims, 4 Drawing Sheets

X-RAY TO VISIBLE IMAGE CONVERTER WITH A CATHODE EMISSION LAYER HAVING NON-UNIFORM DENSITY PROFILE STRUCTURE

BACKGROUND OF THE INVENTION

1. Field of the Invention

This invention generally relates to an image intensifying X-ray to visible converter and, more particularly, to such a converter utilizing a photo-electron cathode for the direct conversion of an X-ray image to an electron equivalent image which can be intensified to produce an enhanced real time visible image. A panel type direct view real time X-ray image intensifier with high spatial resolution and high gain has been made by using this new type X-ray photo cathode. A portable low intensity real time projection type X-ray imagescope has also been made by using the new type X-ray image intensifier.

2. Description of the Prior Art

Most of the early X-ray intensifiers are indirect conversion type, wherein the X-ray is converted to visible light in a scintillator, a visible light photo-electron cathode then converts the photons to electrons which are accelerated and multiplied by different techniques, as shown in U.S. Pat. No. 4,104,516, U.S. Pat. No. 4,140,900, U.S. Pat. No. 4,255,666 and U.S. Pat. No. 4,300,046. One commercially available X-ray imagescope employs an unstable radio active isotope X-ray source and an indirect conversion X-ray intensifier which consists of an X-ray scintillator, a pair of fiber-optic plates, a visible light photo-electron cathode, a micro channel plate, a phosphor display screen and a magnifier. There are numerous disadvantages in these prior art X-ray image intensification devices. The most obvious disadvantage being the use of a scintillator, wherein the response time is limited and unsuitable for use in ultrafast X-ray imaging. It is difficult to have both high spatial resolution and high sensitivity. In order to increase sensitivity, the thickness of the scintillator must be increased, which degrades the spatial resolution. Another disadvantage in using scintillators is that they usually are based on a fiber-optic plate which is the input window of a visible light intensifier. These fiber-optic plates must be specially manufactured for reducing the size of the image in order to improve the coupling and the viewing of the field. The complicated techniques for making fiber-optic plates and visible light photo-electron cathodes and the complicated structure of the intensifier itself, make these intensifiers very expensive. On the other hand, the use of these expensive fiber-optic plates also introduce further loss of light intensity and spatial resolution. It is further noted that because of the use of a visible light photo-electron cathode, the intensifier must be light shielded. Still another disadvantage is the inconvenience of using a radio active isotope as the X-ray source. The source not only supplies X-rays during the operation of the device, it also radiates constantly, day and night, and since the energy of the X-ray is not adjustable the isotope usually has a rather short life time.

SUMMARY OF THE INVENTION

It is therefore an object of the present invention to provide a direct conversion type X-ray photo-electron cathode and intensifier which will provide an ultrafast and inexpensive X-ray imagescope with high spatial resolution and high gain.

According to the invention, there is provided a high quantum efficiency direct conversion type X-ray photo-electron cathode which consists of a cathode substrate made of a light metal, such as aluminum, and a cathode emission layer made of an alkali halide, such as CsI or CsBr. The emission layer has a high density sub-layer coated on the cathode substrate, and the low density sub-layer is coated on the surface of the high density sub-layer, with the low density sub-layer having a decreased density profile from the interface with the high density sub-layer to its emission surface. The high density sub-layer functions to produce direct X-ray photo-electrons, and the low density sub-layer excites secondary electrons.

The high quantum efficiency X-ray photo-electron cathode (5%–10%) is achieved by selecting suitable material for the cathode substrate and the emission layer and by selecting the correct thickness and density profile for high density and low density sub-layers.

This direct conversion type X-ray photo-electron cathode has an ultrafast ($\leq 100$ picosecond) response time and a broad response band (30 KeV to 80 KeV for medical application). This X-ray photo-electron cathode is not sensitive to visible light and does not need any light shielding.

The X-ray image intensifier consists of an X-ray photo-electron cathode, a micro channel plate (MCP) and a phosphor display screen. Two alternative types of intensifiers have been made. The first design employed the above X-ray photo-electron cathode coupled with an MCP. The second design simply coated the X-ray photo-electron cathode emission layer directly on the input surface of the MCP. A phosphor display screen was then provided to be responsive to the electrons eminating from after the MCP. This approach yields not only a higher spatial resolution, but also a compact intensifier. The response time of the intensifier is rather fast (in the order of one hundred picosecond), because of the use of real X-ray photo-electron cathode instead of a combination of X-ray scintillator and visible light photo-electron cathode.

The X-ray photo-electron image intensification is performed by a 1 mm thick MCP, the gain can be as high as $10^4$ for one MCP and $10^7$ for two MCPs in series. The gain can be adjusted by biasing the MCP. The electrons released from the MCP are accelerated by high voltage potential and bombarded onto a phosphor display screen. The final intensified X-ray image may be directly observed or recorded by a camera. The spatial resolution is around 10 lp/mm–15 lp/mm. The time jitter of the image can be less than 100 picoseconds for a 50 mm to 100 mm diameter clear aperture intensifier.

This X-ray intensifier can be operated in a gated mode by using a short high voltage pulse to bias the MCP, which may be important for many ultrafast image applications.

A portable low intensity real time projection type X-ray imagescope consists of a small X-ray tube, an X-ray intensifier and a built-in high voltage power supply. The intensity and energy of the X-ray source as well as the gain of the intensifier can be adjusted. The image of the object can be directly observed or recorded by camera. The X-ray energy can be adjusted from 30 KV to 80 KV (for medical application) and the current is about 100 $\mu$A adjustable.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

Figure 1A:
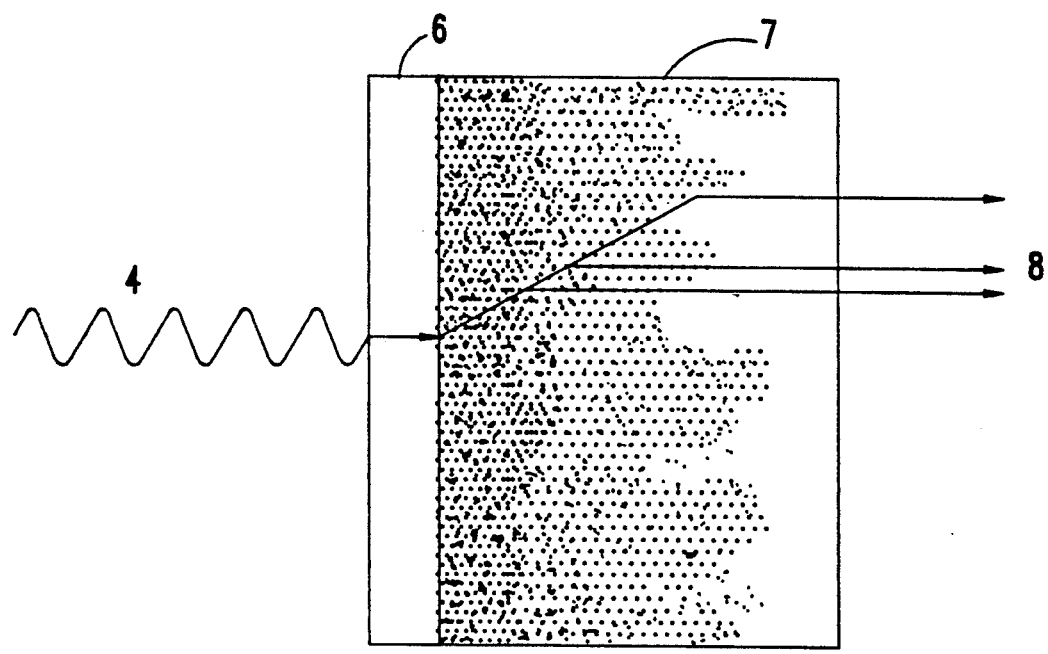
FIG. 1A shows a photo-electron cathode for directly converting an X-ray image to an electron equivalent image as envisioned by this invention.
Figure 1B:
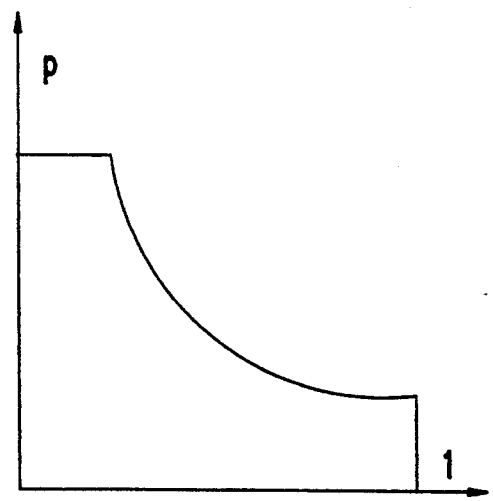
FIG. 1B shows the density profile of the emmissive layer shown in FIG. 1A.

Referring now to the drawings, and more particularly to FIG. 1A, there is shown (FIG. 1 is) a schematic diagram of the new type X-ray photo-electron cathode. The cathode substrate, shown as a metal foil 6, is made of aluminum or similar light metal. The thickness is chosen to assure that the attraction force from the nearby static electric field does not pierce and damage the metal foil and so as not to attenuate the X-ray intensity significantly within a selected band width. We have found in the instant case that a 50 μm thick aluminum foil functions effectively for the band width from 30 KeV to 80 KeV. Cathode emission layer 7 is coated on the light metal cathode substrate to a thickness of about 250 μm and is an alkali halide material, such as CsI or $C_3Br$, having a high secondary electron emission coefficient. The cathode emission layer has a high density sub-layer, which is about 1-2 μm with a varying density of 50-100%, i.e., 2-4 g/cm$^3$. The low density sub-layer has a decreased density profile, as shown in FIG. 1B, extending from the interface with the high density sub-layer to its emission surface. The density distribution profile, as shown in FIG. 1, starts from a 50% density at the interface and decreases to about 2% at the emission surface. The average density is about 10%, i.e., 0.4 g/cm$^3$. The X-ray photons are absorbed in the high density sub-layer to excite high energy photo-electrons, which, in turn, excites many low energy secondary electrons in the low density sub-layer. The density control of the low density sub-layer is very important, as it determines the efficiency of the secondary electron emission. As these secondary electrons are forced by the electric field across the emission layer, they are emitted from the cathode surface and yield electron current 8 shown in FIG. 1A. The electrons emitted from the cathode then are accelerated and multiplied by an MCP. As an alternative, it is also possible to coat the cathode emission layer directly on the input surface of the MCP without having the aluminum foil substrate.

Figure 2:
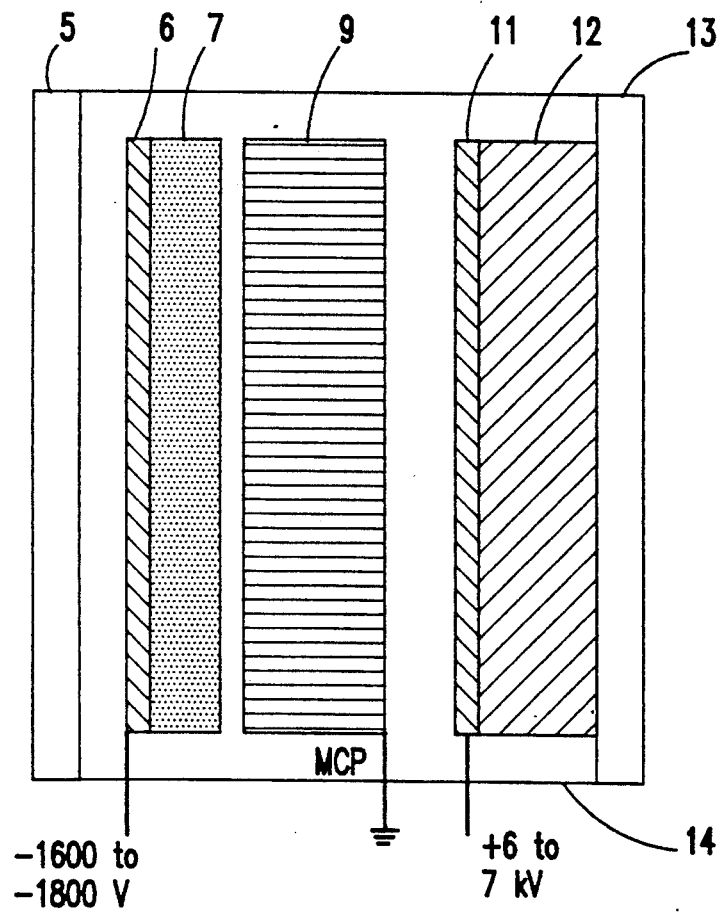
FIG. 2 teaches the use of the photo-electron cathode of this invention in an image intensifying environment.

FIG. 2 is a schematic diagram of the new type X-ray intensifier 10 which consists of an input window 5, an X-ray photo-electron cathode 6 and 7, an MCP 9, an aluminum foil 11, a phosphor display screen 12 and an output window 13 within a light shield 14. Two different kinds of intensifiers have been made. In the first case, an X-ray photo-electron cathode, as shown in FIG. 1A, is followed by an MCP with an 0.4 mm spacing, and in the second case, the X-ray photo-electron cathode emission layer is coated directly on the input surface of the MCP. The other part of the intensifier is the same. The distance between the output surface of the MCP to the aluminum foil 11 is approximately 3 mm. The output surface of the MCP is grounded (V=O). The voltage of the cathode substrate is about −1600 V to −1800 V. The operation potential across MCP is about −900 V to −1000 V for the first case and −1000 V to −1200 V for the second case. Aluminum foil 11 has an adjustable positive potential from +6 KV to +7 KV. 20 Cd/m$^2$ brightness can be achieved on the output screen. The intensifier is panel shaped with diameter from 50 mm to 150 mm and less then 10 mm thickness. It is air shielded and vacuumed to $8 \times 10^{-7}$ torr.

Figure 3:
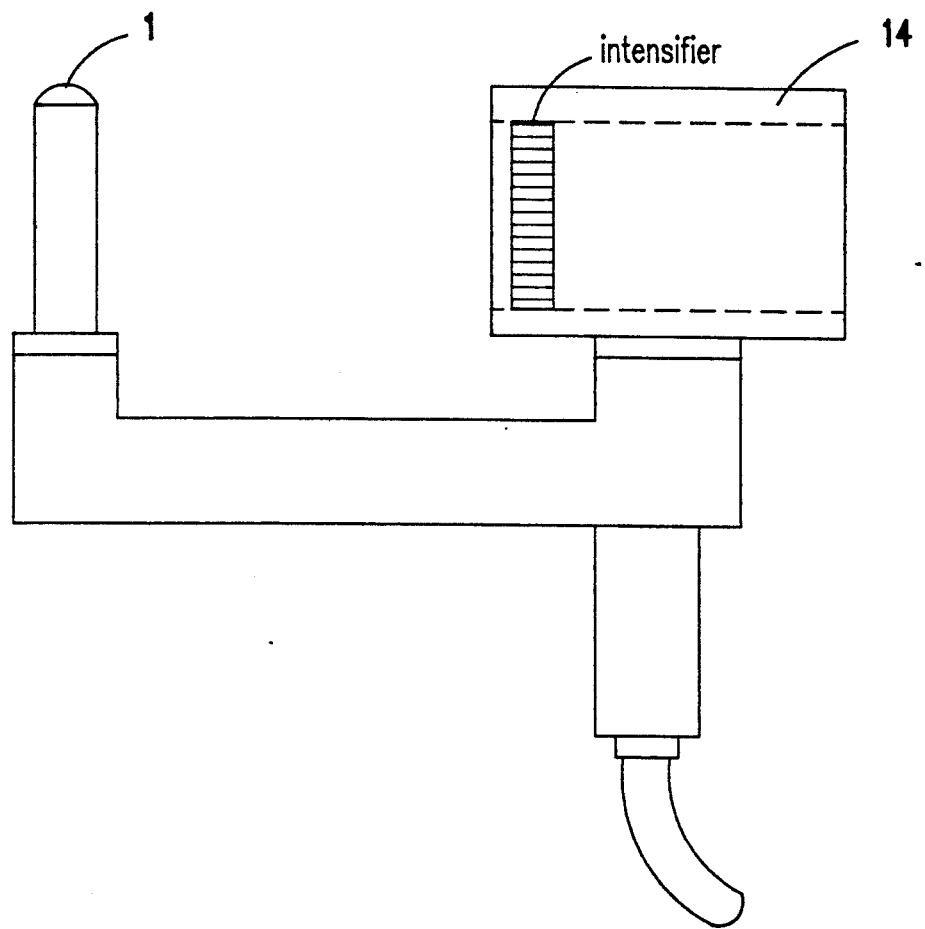
FIG. 3 is a schematic diagram of a portable low intensity real time X-ray imagescope as envisioned by this invention.

FIG. 3 is a schematic diagram of the portable low intensity real time projection type X-ray imagescope. The X-ray source 1 uses a small X-ray tube with a focus spot of about 0.3×0.3 mm$^2$, with a current about 100 μA and a voltage in the range of 30 KV to 80 KV (for medical application). The X-ray tube is shielded by a lead protection cover. A pin hole is prepared in the shield for releasing the X-ray. The size of the pin hole is determined by the size of the input face of the intensifier and the distance from the X-ray source to the input window of the intensifier. The X-ray cone released from the pin hole must be stopped by the intensifier 10 completely. The distance between the X-ray source and the input window of the X-ray image intensifier is about 15 cm to 25 cm depending on the specific application. The intensifier is mounted on one end of an aluminum light shield 14 for easy observation of the image. The image of the object can be directly observed or recorded by a camera from another end of the light shield 14.

Figure 4:
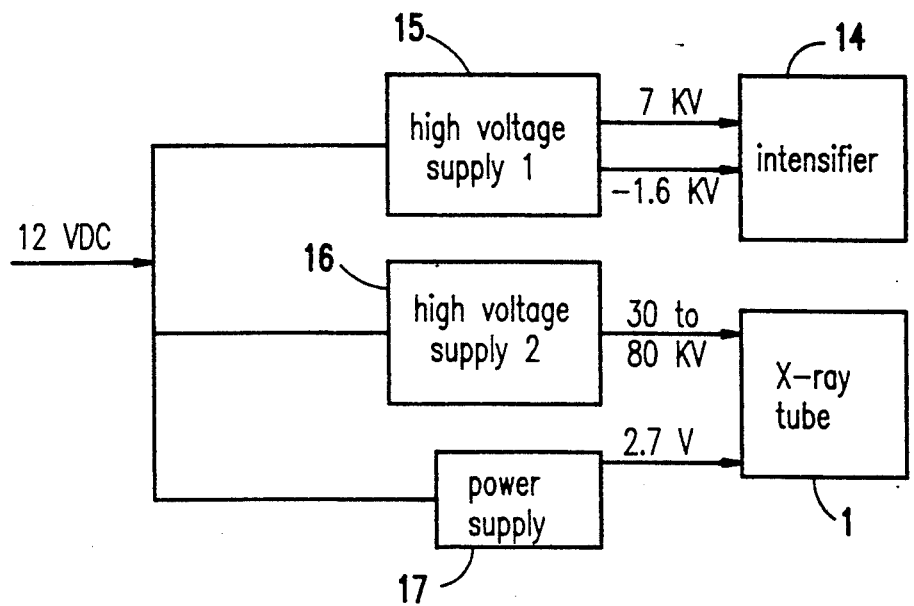
FIG. 4 is a block diagram of a power supply as used with this invention.

FIG. 4 is a block diagram of a typical high voltage power supply unit, comprising separate high voltage supplies 15 and 16 for the intensifier 14 and X-ray tube 1. An additional power supply 17 is provided for the X-ray tube 1. In order to reduce the size and the weight of the power supply, a high frequency oscillator is employed in the high voltage supplies 15 and 16. The high voltages for the X-ray tube and X-ray intensifier are generated by high frequency transformers associated with rectification circuits in a conventional manner. The high voltage power supply unit is built in with the imagescope and shielded with silicon rubber. A 2 A 12 VDC power pack is used for supplying DC current to the high voltage power supply unit. The 12 VDC can be selected from a rechargeable battery or a 120 VAC to 12 VDC adapter.

While the invention has been described in terms of alternate preferred embodiments, those skilled in the art will recognize that the invention can be practiced with modification within the spirit and scope of the appended claims.

What is claimed is:

1. A direct conversion X-ray photo-electron cathode comprising:

a thin substrate of aluminum;

a layer of secondary electron emissive alkali halide selected from the group consisting of CsI and CsBr and deposited on the thin substrate, said layer of secondary electron emissive alkali halide exhibiting a nonuniform density profile structure which decreases in density from a high density at an interface with the thin substrate to a low density at a surface of the electron emissive layer, whereby an X-ray image impinging on the thin substrate is converted to an equivalent electron image and enhanced by the layer of secondary electron emissive alkali halide.

2. A direct conversion X-ray image intensifier comprising:
   a direct conversion X-ray photo-electron cathode having a metallic substrate with a layer of secondary electron emissive material deposited thereon, whereby an X-ray image impinging on the substrate is converted to an electron image and enhanced by the layer of secondary electron emissive material;
   a microchannel plate; and
   an output phosphor display screen, such that an incoming X-ray image is converted to an equivalent electron image by the photo-electron cathode, enhanced by electron multiplication in the microchannel plate and caused to strike the phosphor on the output screen to produce a visible display of the image.

3. The X-ray image intensifier of claim 2, wherein the photo-electron cathode comprises:
   a thin substrate of aluminum;
   a layer of secondary electron emissive alkali halide selected from the group consisting of CsI and CsBr and deposited on the thin substrate, said layer of secondary electron emissive alkali halide exhibiting a non-uniform density profile structure which decreases in density from a high density at an interface with the thin substrate to a low density at a surface of the electron emissive layer, such that an X-ray image impinging on the thin substrate is converted to an equivalent electron image and enhanced by the layer of secondary electron emissive alkali halide.

4. The X-ray image intensifier of claim 3, wherein the photo-electron cathode is spaced from the microchannel plate a distance or approximately 0.4 mm.

5. The X-ray image intensifier of claim 3, wherein the photo-electron cathode is deposited directly on the input face of the microchannel plate.

6. The X-ray image intensifier of claim 3, wherein the X-ray photo-electron cathode has a high density sub-layer of approximately 1-2 μm with the density falling between 50 to 100%, which is approximately 2-4 g/cm³, and a low density sub-layer having a density profile continuously decreasing from about 50-30% at an interface with the high density sublayer to approximately 2-5% density at an output surface.

7. The portable low intensity X-ray imagescope of claim 3, wherein the X-ray photo-electron cathode has a high density sub-layer of approximately 1-2 μm with the density falling between 50 to 100%, which is approximately 2-4 g/cm³, and a low density sub-layer having a density profile continuously decreasing from about 50-30% at an interface with the high density sub-layer to approximately 2-5% density at an output surface.

8. A portable low intensity X-ray imagescope comprising:
   a low intensity source of X-rays;
   an X-ray intensifier including a direct conversion X-ray photo-electron cathode and a microchannel plate having a metallic substrate with a layer of secondary electron emissive material deposited thereon, whereby an X-ray image impinging on the substrate is converted to an electron image and enhanced by the layer of secondary electron emissive material;
   a phosphor display screen adjacent said microchannel plate such that an incoming X-ray image is converted to an equivalent electron image by the photo-electron cathode, enhanced by electron multiplication in the microchannel plate and caused to strike the phosphor on the display screen to produce a visible display of the X-ray image; and
   a power supply including a high voltage supply for the X-ray intensifier and the source of low intensity X-rays, for effecting the operation of the imagescope.

9. The portable low intensity X-ray imagescope of claim 8, wherein the photo-electron cathode comprises:
   a thin substrate of aluminum;
   a layer of secondary electron emissive alkali halide selected from the group consisting of CsI and CsBr and deposited on the thin substrate, said layer of secondary electron emissive alkali halide exhibiting a non-uniform density profile structure which decreases in density from a high density at an interface with the thin substrate to a low density at a surface of the electron emissive layer, such that an X-ray image impinging on the thin substrate is converted to an equivalent electron image and enhanced by the layer of secondary electron emissive alkali halide.

10. The portable low intensity X-ray imagescope of claim 9, wherein the photo-electron cathode is spaced from the microchannel plate a distance or approximately 0.4 mm.

11. The portable low intensity X-ray imagescope of claim 9, wherein the photo-electron cathode is deposited directly on the input face of the microchannel plate.

12. The portable low intensity X-ray imagescope of claim 9, further comprising a common base supporting said low intensity source of X-rays and said X-ray intensifier, said X-ray intensifier being positioned from said low intensity source of X-rays on said common base a distance which provides for the total interception of a cone of X-rays from said low intensity source by said X-ray intensifier, said power supply being contained within said common base.

* * * * *